United States Patent [19]

Muller et al.

[11] Patent Number: 5,016,105
[45] Date of Patent: May 14, 1991

[54] SPECIAL EFFECTS MIXER FOR VIDEO SIGNALS WITH AUTOMATIC AMPLITUDE CONTROL OF SIGNALS RELATING TO LOWER PRIORITY PLANES

[75] Inventors: Klaus-Dieter Muller, Weiterstadt; Ernst Rau, Zwingenberg; Christian Sacher, Darmstadt-Eberstadt, all of Fed. Rep. of Germany

[73] Assignee: BTS Broadcast Television Systems GmbH, Darmstadt, Fed. Rep. of Germany

[21] Appl. No.: 453,393

[22] Filed: Dec. 19, 1989

[30] Foreign Application Priority Data

Dec. 21, 1988 [DE] Fed. Rep. of Germany ....... 3842978

[51] Int. Cl.$^5$ .................. H04N 5/265; H04N 5/262
[52] U.S. Cl. .................................. 358/182; 358/183
[58] Field of Search .................. 358/183, 22, 182; 340/182

[56] References Cited

U.S. PATENT DOCUMENTS 4,668,989 5/1987 Machereth ......................... 358/182

FOREIGN PATENT DOCUMENTS 0236943 9/1987 European Pat. Off. .
3612934 10/1987 European Pat. Off. .
3620155A1 12/1987 Fed. Rep. of Germany .

Primary Examiner—Howard W. Britton
Assistant Examiner—Glen B. Burgess
Attorney, Agent, or Firm—Frishauf, Holtz, Goodman & Woodward

[57] ABSTRACT

In a mixer in which several video signal inputs are multiplied by respective mixing factor signals and the multiplier outputs are added together to produce an output video signal, one of the video inputs is given priority and the mixing factors for the other video inputs are premultiplied by a second set of multipliers in such a manner that the video input of next priority will not have an amplitude greater than what is "left over" by the higher priority signal, and so on in descending order of priority. For further flexibility it is useful to provide a third set of multipliers to allow more external control inputs to participate in determining mixing factors and facilitate special effects. A multiplier of the third set is not necessary for control of the mixing factor of the video input of lowest priority. Even a multiplier of the second set is not strictly necessary for that lowest priority video input.

12 Claims, 3 Drawing Sheets

SPECIAL EFFECTS MIXER FOR VIDEO SIGNALS WITH AUTOMATIC AMPLITUDE CONTROL OF SIGNALS RELATING TO LOWER PRIORITY PLANES

This invention concerns a mixer for video signals having several video signal inputs, multipliers for each input for determining the amplitude and/or a keying pattern for the separate signals to be mixed and a common addition stage for adding together the multiplier outputs.

Video mixers serve to derive an output video signal from two or more input video signals The input video signals represent different pictures, while the output video signal embodies the mixed output piture to be transmitted or recorded. Among the accomplishments attainable with video mixers, there is, in particular, the fading of one picture into another, either by relative amplitude fading in and out or else by a so-called special effects fade, in which one picture encroaches on another, from the edges, from the middle or from one edge to another, until it has replaced the oher picture. Furthermore two or more input pictures can be combined into a single output picture for more than a transition from one scene to another. A background picture may be combined with a foreground picture by the blue wall method. Similarly, some writing or a smaller picture can be inserted in a principal picture.

In known video mixers, for example as disclosed in German published Pat. application No. (OS) 36 20 155, each of the input video signals contributing to the output picture is multiplied with a single control signal to establish relative amplitude. Then the resulting modified video signals are added together. The control signals may consist of one or more component signals. For distinguishing these control signals provided for multplication with video signals from other control signals the former will be referred to hereinafter as mixing factor signals.

In the known video mixers subjecting the input video signals to two or more multiplication circuits in sequence is avoided because each time there is some impairment of signal quality. Furthermore the known video mixers contain no means for a mixing in which the various input pictures have different priorities as if they were in different planes of emphasis or distinction.

SUMMARY OF THE INVENTION

It is an object of the invention to provide video mixing equipment in which the input pictures to be mixed can be ranked for their respective contribution according to priority "planes" for the output picture, whether or not the input pictures at least partly overlap and have transparency so that underlying parts of an input picture remains visible through a superposed input picture.

Briefly, a second set of multipliers is interposed between the primary multipliers and the sources of mixing control signals, in which these control signals can be premultiplied in a manner taking account of the proportional contributions provided for components from higher priority video signal inputs. No premultiplier is used for the mixer control signal supplied to the primary multiplier as the mixing control factor signal for the highest priority video signal input. Its value is subtracted from a fixed value representative of unity and the result is furnished to the premultiplier for the mixing control signal for the video signal input of next highest priority. For the premultiplication of the mixing control signal for the video signal input of third priority, the mixing factor signal for the first priority signal is added to the premultiplied mixing factor for the second priority signal and the resulting sum is subtracted from the same fixed value representative of unity, after which the difference result is used for the task of premultiplying and so on, so that the subsequent addition of the video signal contribuions will never exceed a fixed level representative of unity (i.e. of the amplitude range of the output video signal).

The invention has the advantage that with a simple control system a large number of video signal inputs can be made to contribute to an output picture. When the mixer control signals subdivide the picture field, rather than superimpose pictures so than both can be seen, it may be desirable to interrupt the priority sequence, and an elaboration of the invention provides switches for so doing. The capability of the invention for handling a large number of video inputs is particularly useful where multiple subdivisions of the picture field are occasionally to be made. Another elaboration of the invention which preserves simplicity of controls povides still another set of multipliers so that the mixer control signal for any video input can be generated by two independent inputs.

BRIEF DESCRIPTION OF THE DRAWINGS

Further details of the invention are best understood by reference to illustrative embodiments of the invention described with the assistance of the annexed drawings, in which.

The same parts are given the same reference symbols when they appear in two or three of the figures of the drawings.

DESCRIPTION OF THE ILLUSTRATED EMBODIMENTS

Figure 1:
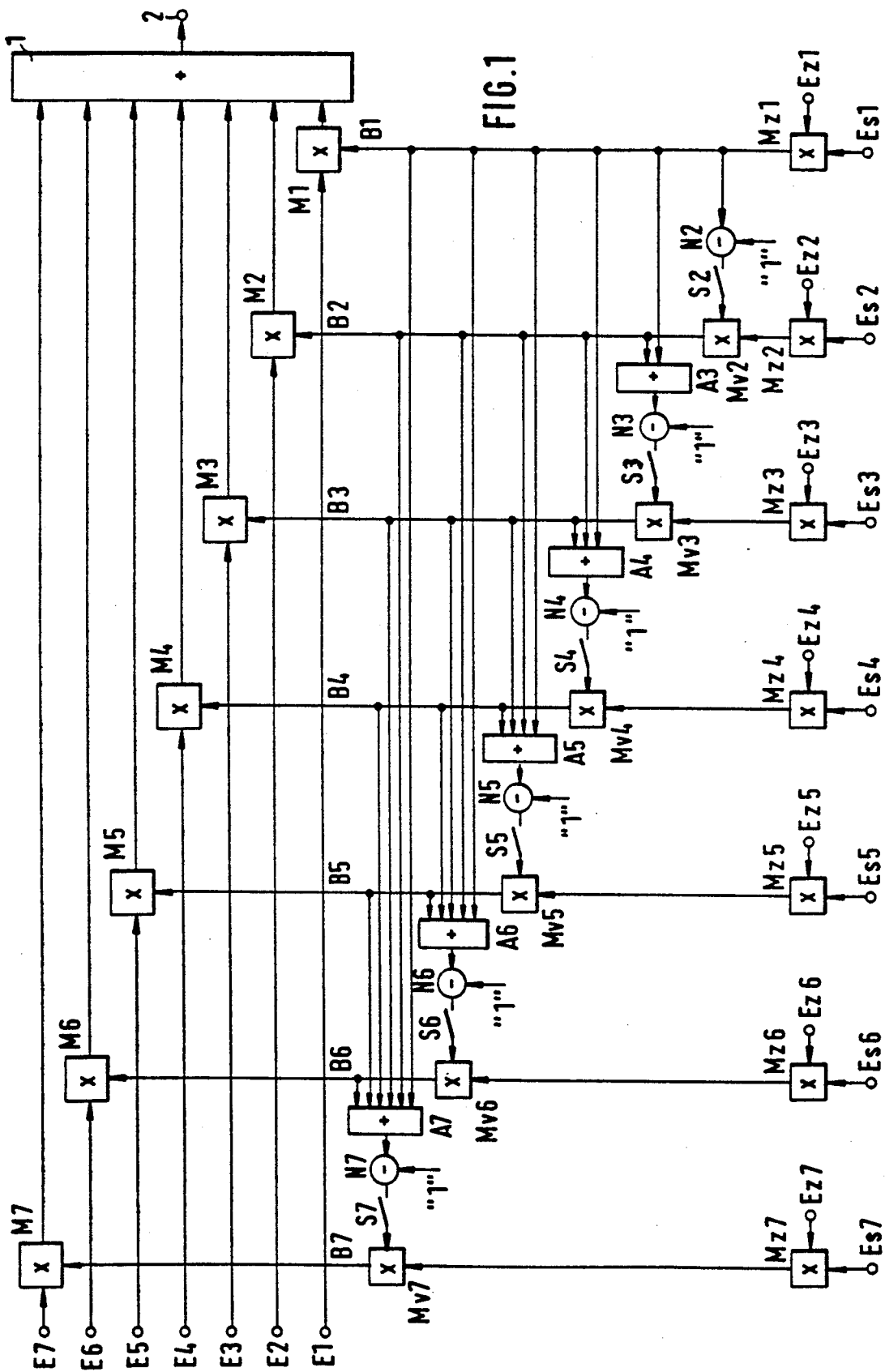
FIG. 1 is a circuit block diagram of a first embodiment of the invention having 7 video signal inputs and up to 14 control adjustments or inputs.

Primary multipliers M1, M2... M7 are shown in the mixer system illustrated in FIG. 1. Their outputs are respectively connected to the inputs of a addition circuit 1, which has an output 2 where the output video signal is made available. A separate input video signal can be supplied to each of the inputs E1, E2,... E7 and these input video signals are multiplied by respective mixing factor signals B1, B2... B7 and passed on to the addition circuit 1. Each of the mixing factor signals can take on any value from 0 to 1 such that the sum of all mixing factor signals is equal to 1. When a mixing factor signal has the value 0, the corresponding input video signal is not passed on to the addition circuit, whereas when a mixing factor signal has the value 1 the corresponding input video signal is transmitted at full amplitude.

In order to assure that the sum of the values of the mixing factor signals is always 1 (or 100%), secondary multipliers Mv2, Mv3... Mv7—which are also aptly referred to as premultipliers—are provided in the system of FIG. 1. Each of these premultipliers is supplied with a premultiplier control signal the value of which is the unity-complement of the sum of all of the higher-priority mixing factor signals. In order to supply such premultiplier control signals, (secondary) addition circuits A3 to A7 are provided each having an output connected to an input of a subtraction circuit N3 to N7, which in turn has an output connected to an input of a premultiplier. The premultiplier Mv2, however, has its premultiplier control signal input connected simply to a substraction circuit N2, because only one mixing factor signal B1 outranks the mixing factor signal B2, so that no addition circuit is needed for the input to N2.

FIG. 1 also shows tertiary multipliers Mz1, Mz2, ... Mz6, all but the first-named of which are interposed in a mixing factor line ahead of a pre-multiplier M2, M3,... M6. The multiplier Mz1, of course, is interposed directly ahead of the primary multiplier M1. Each of these tertiary multipliers has an input connected to one of the control signals Es1, Es2,... Es7 and another input connected to a corresponding one of the control signals Ez1, Ez2,... Ez6. As will be explained there are few occasions for any signal change at Es7.

Switches S2, S3,... S7 are respectively interposed betwen the premultipliers Mv21, Mv3,... Mv7 and the corresponding subtraction circuits N2, N3,... N7. When the switches S2, S3,... S7 are closed, the additions, subtractions and premultiplications proceed as above-described so that the corresponding mixing factor signals B2, B3,... B7 after premultiplication have values that are still "left over" from the higher priority mixing factor signals. If, for example, the mixing factor signal $B1=1$, the control signal going up the B2 line from the control input Es2 is multiplied by 0 in the premultiplier Mv2, so that the mixing factor signal $B2=0$. The signals $B1=1$ and $B2=0$ are then supplied to the addition circuit A3 so that the sum 1 appears at its output, which becomes 0 after the subtraction from 1, so that the mixing factor signal B3 likewise becomes 0. This shows the priority sequence. The mixing factor signal B1, and thereby also the video signal at the input E1, have the highest priority, after which the other input video signals follow in the sequence of the numerical indices incorporated in the reference symbols used in FIG. 1.

The control signals entered into the system of FIG. 1, designated there as Es1, Es2,... Es7 and Ez1, Ez2,... Ez7, can have not only the values 0 and 1, but also any intermediate values whatever. They may be quasi-static, varying not at all or only slowly in comparison with the television frame frequency, or they may be pulse signals synchronized with the picture field and line frequencies (so-called special effect or pattern signals).

The mixing factor signal B7 having the lowest priority takes a value of what is left by the other mixing factor signals. To that extent, therefore, independent control of the primary multiplier M7 is not strictly necessary. To take care of the case in which the higher priority mixing factor signals B1, B2,... B6 are all 0 and a video input signal present at input E7 should nevertheless not get into the output picture signal, a setting signal of the value 0 could still be usefully furnished at the input Es7. No tertiary multiplier is needed, furthermore in the Es7 to M7 line. In fact the secondary multiplier Mv7 needs to multiply only by either 1 or 0, so that a simple switch could serve as that multiplier.

One or more multipliers can be taken out of the priority sequence by means of the switches S1, S2,... S7. By opening all these switches the mixer apparatus of the invention can be operated as a so-called "knob-a-channel" mixer. In that case it is nevertheless necessary to assure in some known way that the amplitude of the output video signal should not exceed its permissible limit values, for example, by limiting the values of control signals Es1, Es2,... Es7 and Ez1, Ez2,... Ez6 or by automatic output amplitude regulation.

Figure 2:
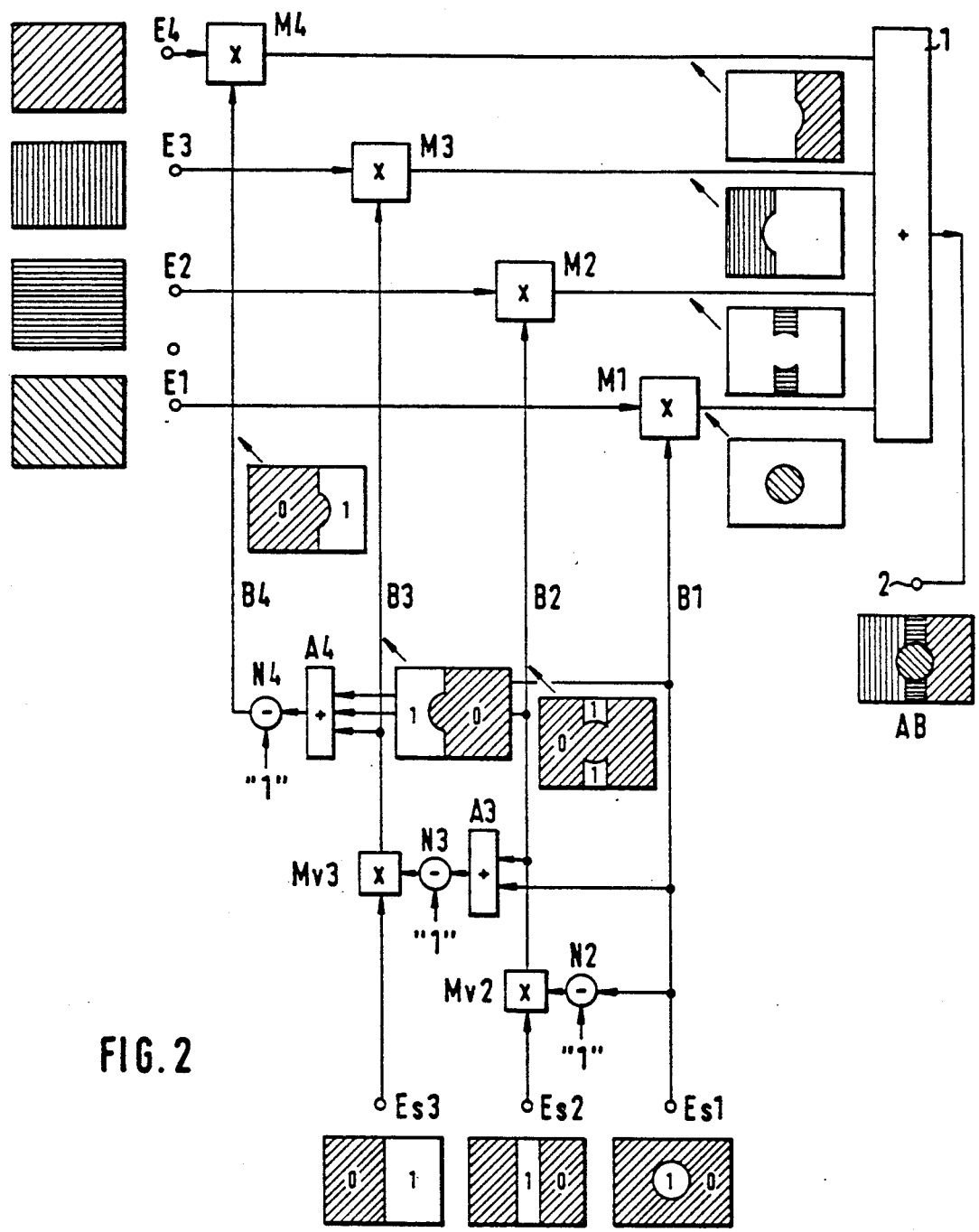
FIG. 2 is circuit block diagram of a second embodiment of the invention having four video signal inputs and three control inputs, illustrating field subdivision possibilities.

In the illustrative embodiment shown in FIG. 2, only four video inputs E1 to E4 and four primary multipliers M1 to M4 are provided. Three control inputs may be respectively supplied at Es1, Es2 and Es3. To explain the operation of this example of an embodiment, four input pictures EB1 to EB4 are represented by different kinds of shading shown in rectangles adjacent to the video inputs. Furthermore, three control signals are assumed for this example the levels of which in the individual picture representations are given as 1 or 0, with the further provision of shading of those parts at which the level is 0, shown in rectangles at the respective control inputs. The output signal is diagrammed in a rectangle at the output terminal 2.

The external control signal supplied at the input Es1 is, for example, a so-called key signal or pattern signal which has the value 1 within a circle of the picture and has the value 0 outside that circle. The exernal control signal at the control signal input Es2 is a so-called border signal that emphasizes a boundary line, in this case a vertical line in the middle of the picture, having the value 1 in the vertical median strip and the value 0 elsewhere. Finally a special effect signal known as a wipe signal is supplied to the control signal input Es3 whereby in each horizontal line there is a signal jump from 0 to 1. A pattern signal of this type represents one of many possibilities for fading between two pictures; in this case the boundary between 0 and 1 is shifted from the left-hand picture edge towards the right. When it combines with the border signal, the latter is likewise shifted so that it covers the jump of the pattern signal supplied at Es2.

The external control signal Es1 is directly multiplied with the video input signal E1. Within the circle 10 the input video signal E1 is supplied at the addition circuit 1 at full amplitude, whereas outside of the circle 10 the input video signal E2 is fully suppressed. As the result of the control of the multipliers Mv2 and Mv3 by the addition circuits A2 and A3 and likewise of the control of the multiplier M4 the addition circuit A4 the mixing factor signals B2, B3 and B4 each have a zero value, so that within the circle 10 the input video signals E2, E3 and E4 do not reach the addition circuit 1. The content of the input picture E1 thus covers all other picture components within the circle 10.

Outside of the circle 10 the picture mix is determined by the external control signals Es2 and Es3. When the border signal E2 has the value 1, the lower priority signals E3 and E4 are suppressed so that at the output of the multiplier M2 the picture 11 appears. The remaining portions of the picture are controlled by the external pattern signal Es3, shown at 12 so that the left-hand portion is generated by the input video signal E4 and the right-hand portion by the input video signal E3. The output picture 13 therefore contains, in its foremost "plane", the disk within the circle 10 filled with the input video signal E1, then just "behind" it a vertical stripe produced by the border signal and the input video signal E2—which for example could be a single solid color—, then to the left, the left-hand portion of the input video signal E4 and, to the right, the right-hand portion of the input video signal E3.

If now the output signal 13 is considered as a stage of a special effect fading in which the 0 to 1 jump shifts from left to right across the full picture width, the result is the following: first the input video signal E3 is to be seen surrounding the disk-shaped picture inset of the input video signal E1. Then the input video signal E4 is faded in by advancing it in from the left, preceded by a separation line or stripe. The fading in takes place in a "plane" that is "behind" (because of lower priority) the disk-shaped insert of the input video signal E1.

Figure 3:
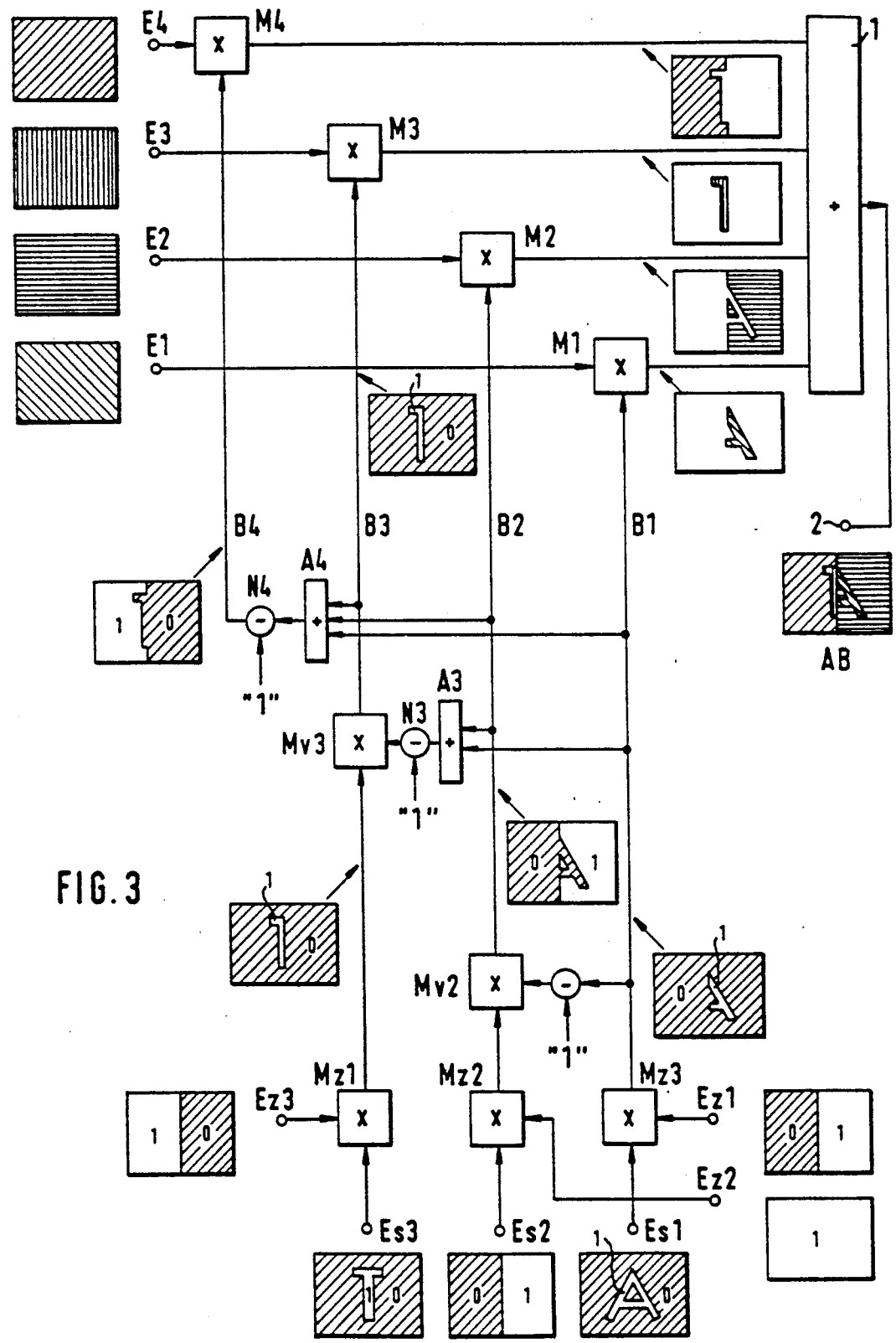
FIG. 3 is a circuit block diagram of a third embodiment of the invention having four video signal inputs and six control inputs, illustrating further field subdivision possibilities.

The illustrative embodiment shown in FIG. 3 differs from the embodiment of FIG. 2 by having tertiary multipliers Mz1, Mz2 and Mz3, in addition to secondary multipliers Mv2 and Mv3 and primary multipliers M1, M2, M3 and M4. The supply of additional external control signals is thereby made possible as will now be illustrated by reference to an example of their use.

Four different input video signals are supplied at the respective four inputs E1, E2, E3 and E4, their different picture contents being represented in FIG. 3 by different kinds of shading, again shown in rectangles adjacent to the respective inputs. The external control signal inputs Es1 and Es3 are respectively supplied with pattern signals that respectively show letters A and T. Within the boundaries of these capital letters the respective signal has the value 1, while its value is 0 elsewhere. A special effect signal, in which the signal value is 0 to the left of a vertical line and is 1 to the right of the line, is supplied to the input Es2. The same special effect signal is supplied to the additional external control signal input Ez1 and also, but in inverted form, to the additional input Ez3. At the additional input Ez2 and external control signal having a constant value of 1 is applied in order to require the multiplier Mz2 to pass on the control signal from Es2 at full amplitude.

Without the additional (tertiary) multiplier Mz1 and the external control signal Ez1, the pattern signal Es1 would have the highest priority over the entire picture, as is the case in FIG. 2. By virtue of the fact that the special effect signal has the value 0 over the left-hand half, the pattern signal Es1 can be effective only in the right-hand half. Similarly, in the right-hand half of the output picture, but outside of the letter "A", the mixing factor signal B1 is put at 0, while B2=1. Thus outside of the letter "A" the input video signal E2 provides the picture content in the right-hand part thereof.

Within the left half of the output picture 20 of FIG. 3 the mixing factor signal B2 is at 0, since the special effect signal Es2 has the value 0 there. In consequence the external control signals supplied to the scondary multiplier Mv3 by the teritary multiplier Mz3 will be passed on at full amplitude to the primary multiplier M3. Because of the pattern signal Es3, this amplitude prevails only within the left portion of the letter "T" where that pattern signal has the value 1, so that the input video signal E3 is passed on to the addition circuit 1 by the multiplier M1 only during that picture portion. Outside of the letter "T" the mixing factor signal B3 has the value 0, so that the mixing factor control signal B4 there takes on the value 1 and the input video signal E4 is then passed on to the addition circuit 1.

Although the invention has been described by reference to a few particular illustrative embodiments, it will be understood that variations and modifications are possible within the inventive concept.

Certain multipliers have been referred to as "primary", others as "secondary" and still others as "tertiary" in the foregoing description without any intention of designating any necessary or desirable differences in their construction, but rather for consistency with the claims which follow this description, where it has been found useful to refer to first, second and third sets of multipliers in order to define the invention with adequate clarity.

We claim:

1. A mixer for video signals having a plurality of video signal inputs (E1, E2,...) and a plurality of first multipliers (M1, M2,...) respectively having first inputs connected respectively to said video signal inputs, second inputs connected respectively to outputs of mixing control signal sources (Es1, Es2,...) and outputs connected to respective inputs of a common addition circuit (1), and further comprising:

a plurality of second multipliers (Mv2, Mv3,...) respectively interposed between all but a first one (M1) of said first multipliers and all but a first one (ES1) of said mixing control signal sources for premultiplying the respective outputs thereof and respectively having outputs connected respectively to said second inputs of said first multipliers, first inputs connected respectively to said mixing control signal sources other than said first one thereof, and second inputs, said first one (M1) of said first multipliers being connected to and identifying a first one (E1) of said video signal inputs as the video signal input which is of highest priority;

a plurality of complement-forming subtraction circuits (N2, N3...) respectively having first inputs connected to a signal source of constant value ("1"), outputs connected respectively to said second inputs of said respective second multipliers (Mv2, Mv3,...), and second inputs; a first one of said subtraction circuits (N2) having its second input connected to said second input of said first one (M1) of said first multipliers and its output connected to a first one (Mv2) of said second multipliers, and thereby defining a second one (E2) of said video signal inputs as the video signal input of second priority, and a plurality of second addition circuits (A3, A4...) respectively having outputs connected to the respective second inputs of all but said first one (N2) of said subtraction circuits, a first one of said second addition circuits (A3) having a first input connected to said second input of said first one of said first multipliers (M1) and a second input connected to a second input of a second one (M2) of said first multipliers and an output connected through a second one (N3) of said substractors to a second one (MV3) of said second multipliers and thereby identifying a third one (E3) of said video signal inputs as the video signal input of third priority, at least one other (A4, A5...) of said second addition circuits having an output connected through one of said subtraction circuits (N4, N5...) to one of said second multipliers (Mv4, Mv5...) and inputs connected respectively to second inputs of first multipliers (M1, M2, M3...) which are connected to video signal inputs of higher priority, and thereby defining the priority of at least one (E4, E5...) of said video signal inputs.

2. The mixer of claim 1 wherein at least one of said mixing control signal sources has means for setting a steady mixing control signal represented by an electrical value of the respective signal source and at least some of said mixing control signal sources are connectable to keying signals.

3. The mixer of claim 1 wherein a switching means (S2, S3...) is interposed between the output of each said subtraction circuit and a second input of a said second multiplier (Mv2, Mv3...) for selectively taking the video signal input associated with the respective second multiplier out of the priority sequence normally defined by said second addition circuits.

4. The mixer of claim 2 wherein a switching means (S2, S3...) is interposed between the output of each said subtraction circuit and a second input of a said second multiplier (Mv2, Mv3...) for selectively taking the video signal input associated with the respective second multiplier out of the priority sequence normally defined by said second addition circuits.

5. A mixer for video signals having a plurality of video signal inputs (E1, E2,...) and a plurality of first multipliers (M1, M2,...) respectively having first inputs connected respectively to said video signal inputs, second inputs connected respectively to outputs of mixing control signal sources (Es1, Es2,...) and outputs connected to respective inputs of a common addition circuit (1), and further comprising:
 a plurality of second multipliers (Mv2, Mv3,...) respectively interposed between all but a first one (M1) of said first multipliers and all but a first one (ES1) of said mixing control signal sources for premultiplying the respective outputs thereof and respectively having outputs connected respectively to said second inputs of said first multipliers, first inputs connected respectively to said mixing control signal sources other than said first one thereof, and second inputs, said first one (M1) of said first multipliers being connected to and identifying a first one (E1) of said video signal inputs as the video signal input which is of highest priority;
 a plurality of complement-forming subtraction circuits (N2, N3...) respectively having first inputs connected to a signal source of constant value ("1"), outputs connected respectively to said second inputs of said respective second multipliers (Mv2, Mv3,...), and second inputs; a first one of said subtraction circuits (N2) having its second input connected to said second input of said first one (M1) of said first multipliers and its output connected to a first one (Mv2) of said second multipliers, and thereby defining a second one (E2) of said video signal inputs as the video signal input of second priority, and
 at least one (A3) second addition circuit having an output connected to said second input of a said subtraction circuit (N3) other than said first subtraction circuit (N2) having an input to each second input of a said first multiplier which has its first input connected to a said video signal input of higher priority than the video signal input connected to the first input of the multiplier to which the second multiplier connected through a said subtraction circuit to the respective addition circuit.

6. The mixer of claim 5 wherein at least one of said mixing control signal sources has means for setting a steady mixing control signal represented by an electrical value of the respective signal source and at least some of said mixing control signal sources are connectable to keying signals.

7. The mixer of claim 5 wherein a switching means (S2, S3...) is interposed between the output of each said subtraction circuit and a second input of a said second multiplier (Mv2, Mv3...) for selectively taking the video signal input associated with the respective second multiplier out of the priority sequence normally defined by said second addition circuits.

8. The mixer of claim 1, further comprising a plurality of third multipliers (Mz1, Mz2,...) interposed respectively between said mixing control signal sources and said respective first multipliers, being interposed between a said signal source signal and a said second multiplier if a said second multiplier is interposed between the respective source and the respective first multiplier, said third multipliers respectively having first inputs connected respectively to said mixing control signal sources and second inputs respectively connected to additional mixing control signal sources (Ez1, Ez2,...) each of which is adjustable.

9. The mixer of claim 2, further comprising a plurality of third multipliers (Mz1, Mz2,...) interposed respectively between said mixing control signal sources and said respective first multipliers, being interposed between a said signal source signal and a said second multiplier if a said second multiplier is interposed between the respective source and the respective first multiplier, said third multipliers respectively having first inputs connected respectively to said mixing control signal sources and second inputs respectively connected to additional mixing control signal sources (Ez1, Ez2,...) each of which is adjustable.

10. The mixer of claim 5, further comprising a plurality of third multipliers (Mz1, Mz2,...) interposed respectively between said mixing control signal sources and said respective first multipliers, being interposed between a said signal source and a said second multiplier if a said second multiplier is interposed between the respective source and the respective first multiplier, said third multipliers respectively having first inputs connected respectively to said mixing control signal sources and second inputs respectively connected to additional mixing control signal sources (Ez1, Ez2,...) each of which is adjustable.

11. A mixer for video signals having first and second video signal inputs (E1, E2) and first and second principal multipliers (M1, M2) respectively having first inputs respectively connected to said first and second video signal inputs and second inputs respectively connected to outputs of first and second mixing control signal sources (Es1, Es2,...) and having outputs respectively connected to inputs of a common addition circuit (1) and further comprising:
 a first auxiliary multiplier (Mv2) interposed between said second principal multiplier (Mv2) and said second mixing control signal source (Es2) having an output connected to said second input of said second principal multiplier (M2), a first input, and a second input, said first input being connected to said second mixing control signal source, and
 a complement-forming subtraction circuit (N2) having a first input connected to a signal source of constant value ("1") and a second input connected to said second input of said first principal multiplier, and an output connected to said second input of said auxiliary multiplier (Mv2).

12. The mixer of claim 11, further comprising a second auxiliary multiplier (Mz1) interposed between said first multiplier factor signal source and said first principal multiplier (M1) having a first input connected to said first mixing control signal source, a second input connected to first adjustable steady potential, and a third auxiliary multiplier interposed between said first auxiliary multiplier (Mv2) and said second mixing control signal source and having a first input connected to said second mixing control signal source and a second input connected to a second adjustable steady potential.

* * * * *